Nov. 2, 1948.   W. UMBDENSTOCK   2,452,703
DRILL GRINDING MACHINE
Filed Dec. 18, 1944   6 Sheets-Sheet 3
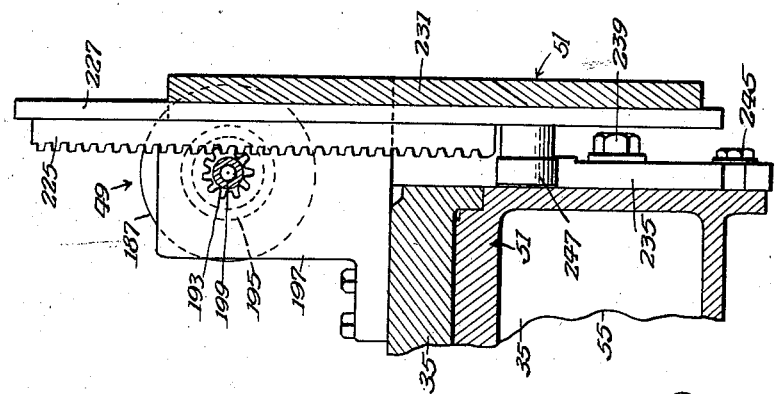
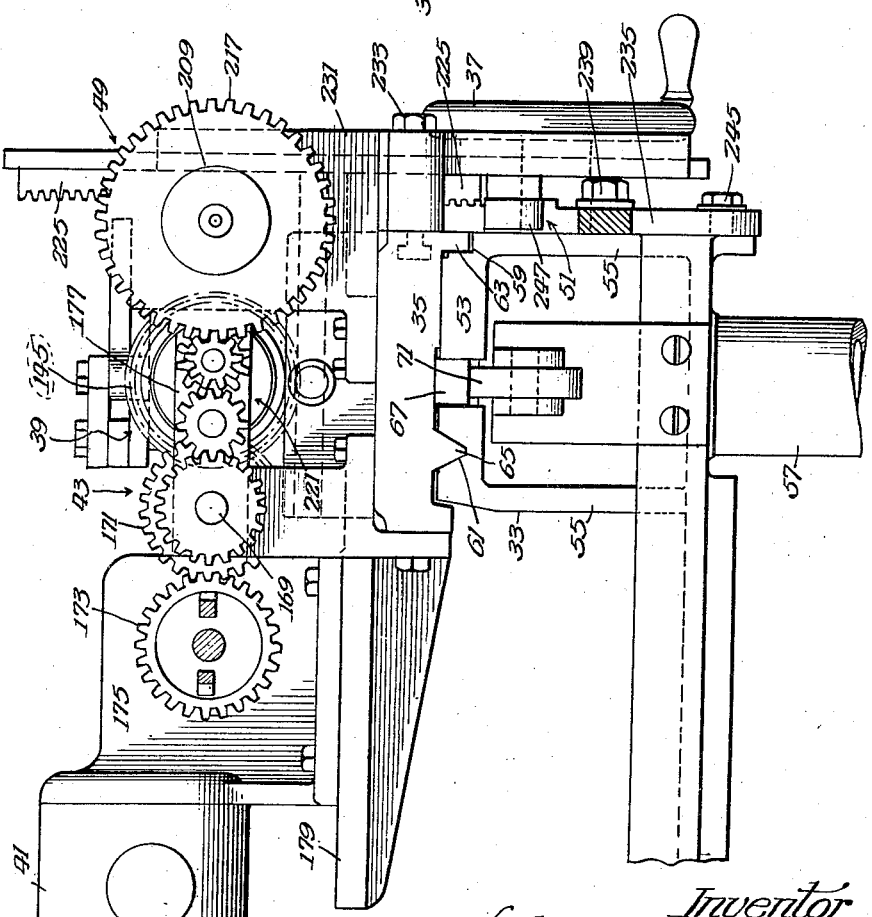
Inventor
Walter Umbdenstock
By: Spencer, Marzall, Johnston & Cook
Attys Nov. 2, 1948.  W. UMBDENSTOCK  2,452,703
DRILL GRINDING MACHINE
Filed Dec. 18, 1944  6 Sheets-Sheet 4
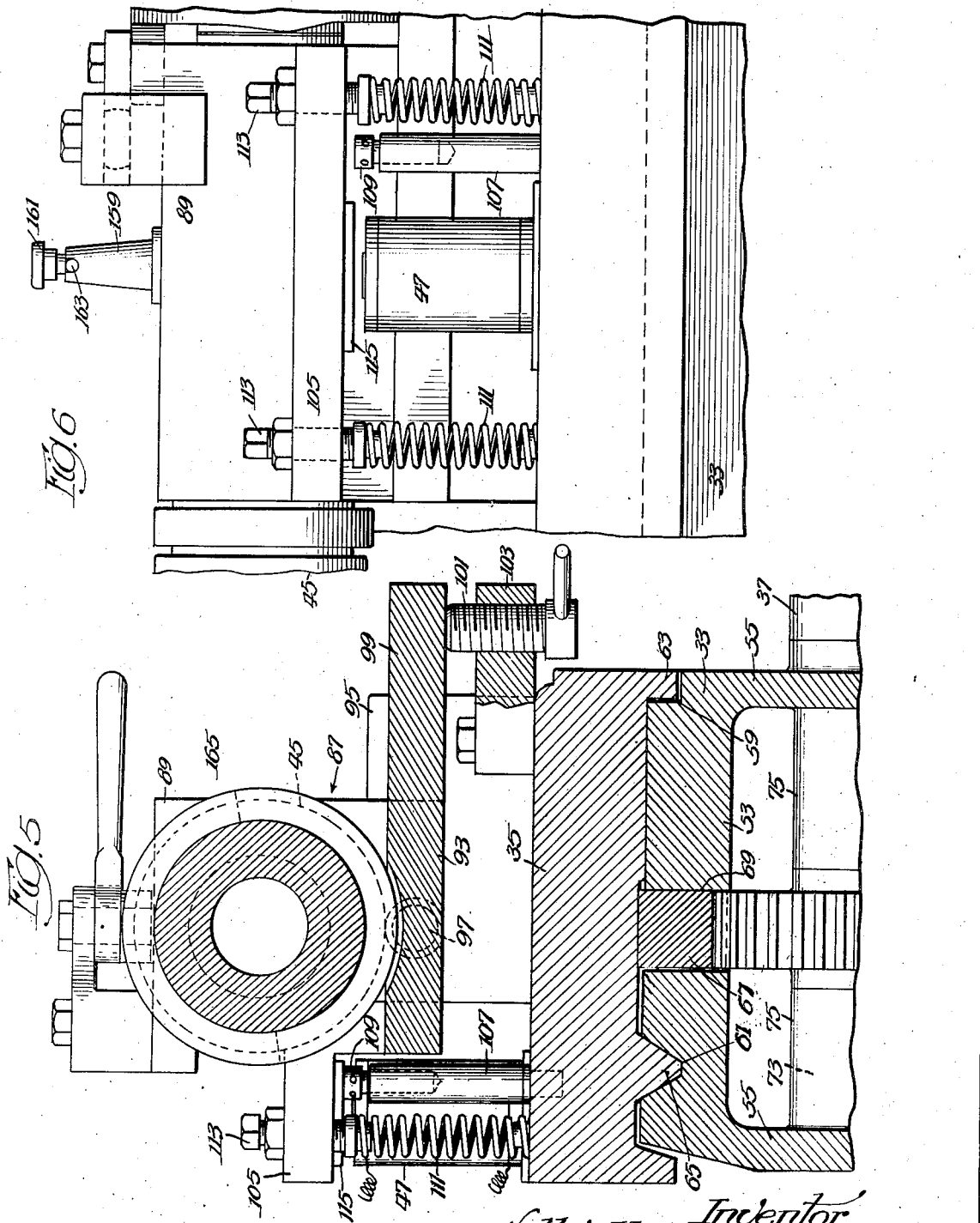
Inventor
Walter Umbdenstock
By Spencer, Margall, Johnston & Cook
Attys

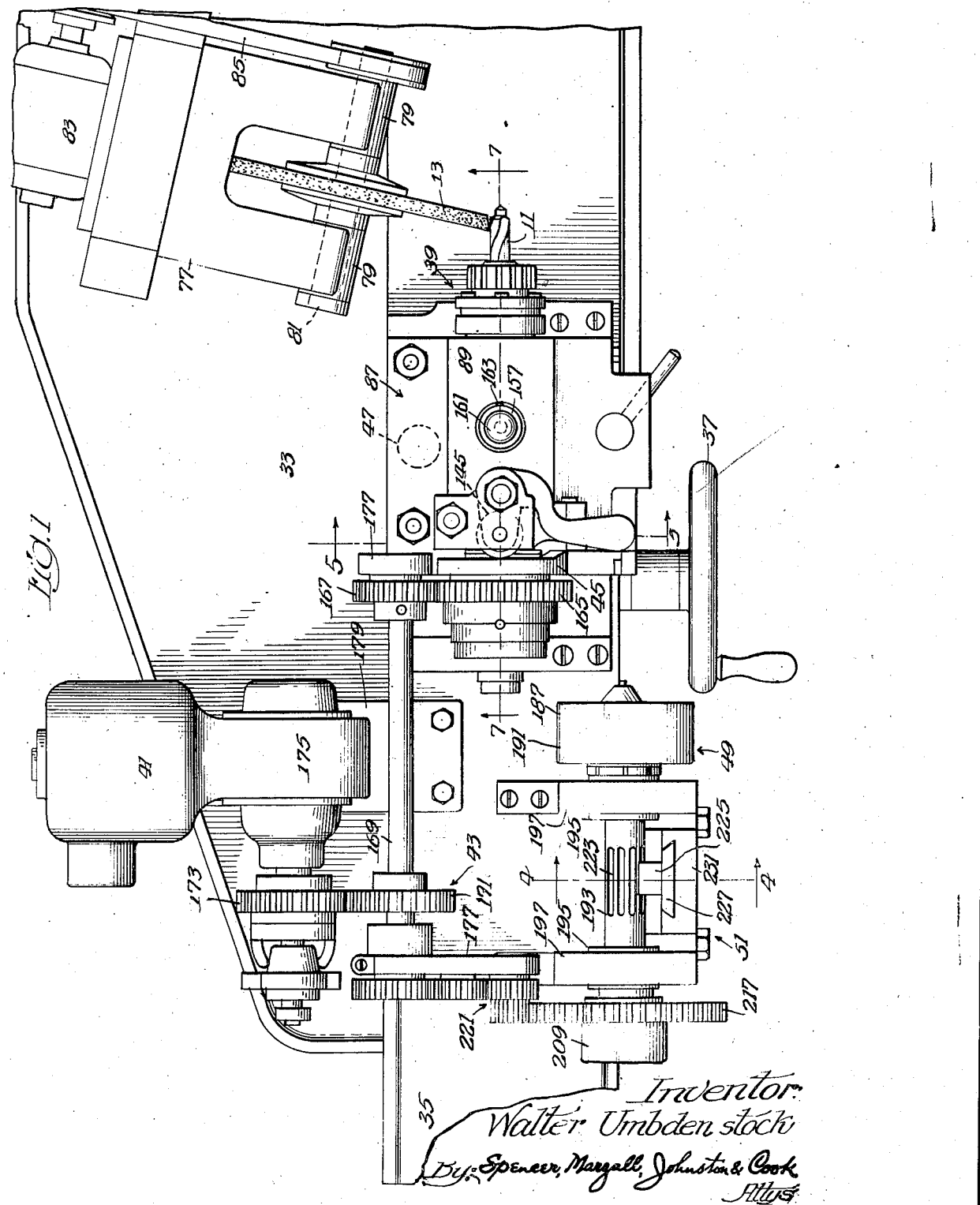

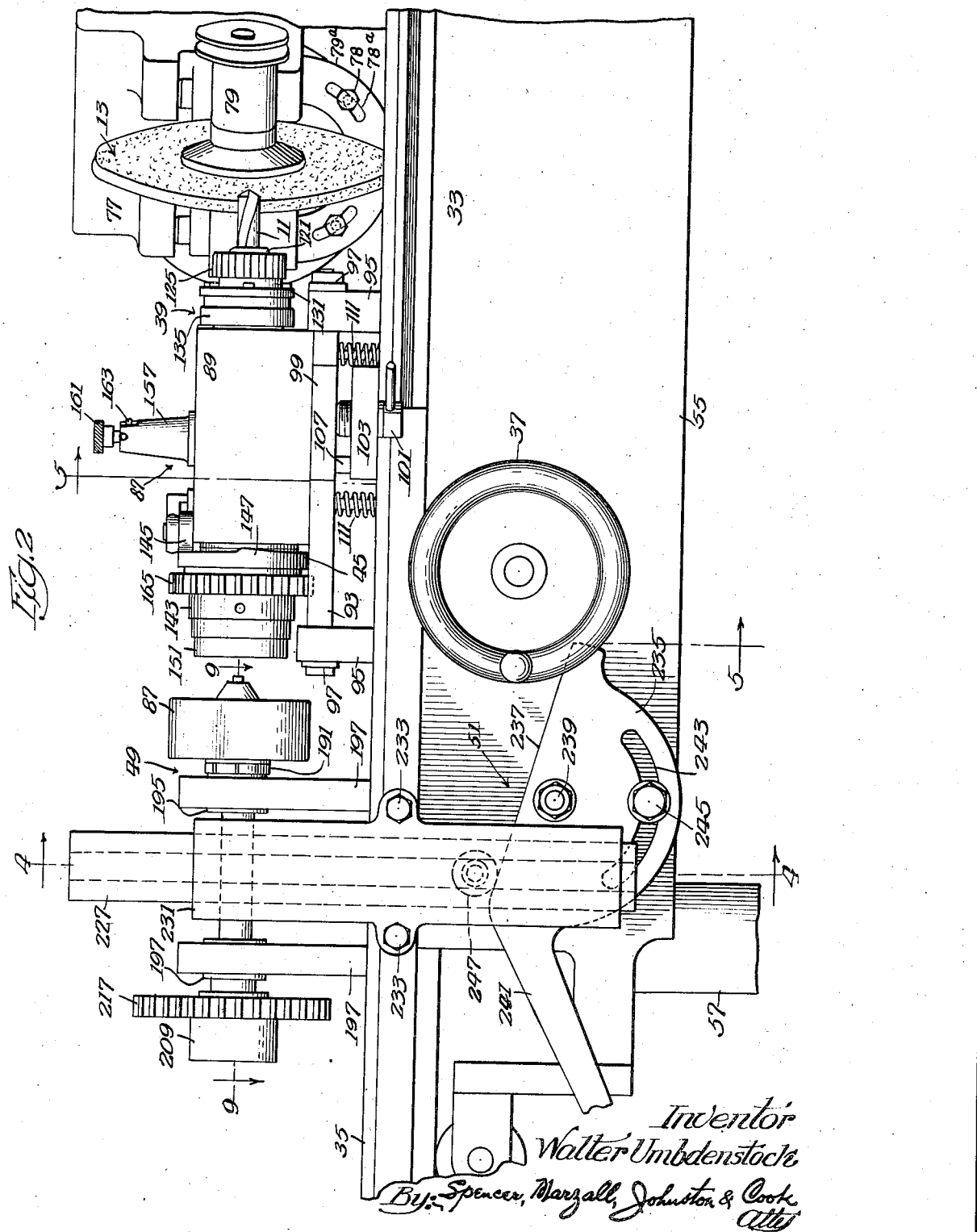

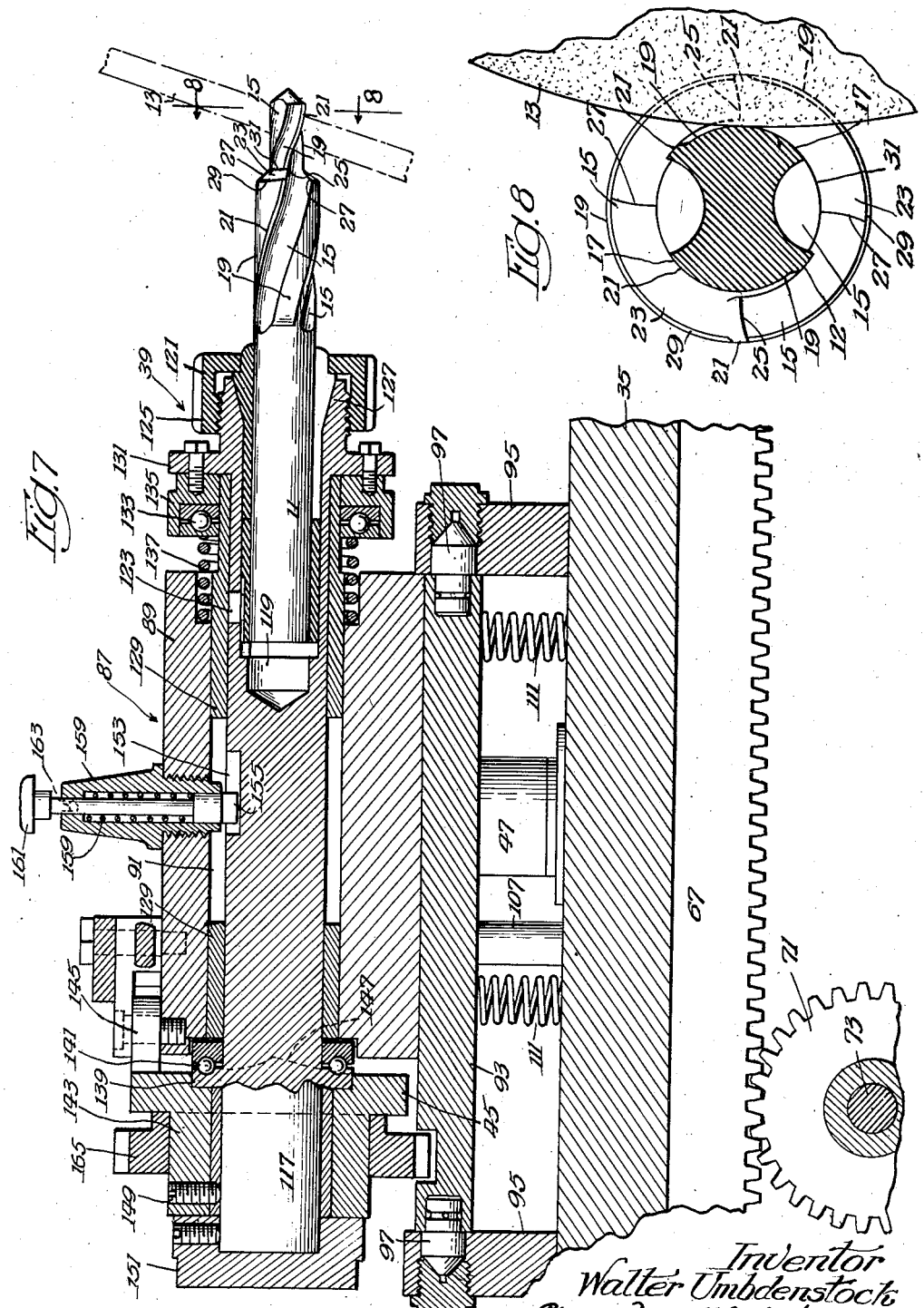

Nov. 2, 1948.       W. UMBDENSTOCK       2,452,703
DRILL GRINDING MACHINE
Filed Dec. 18, 1944                6 Sheets-Sheet 6
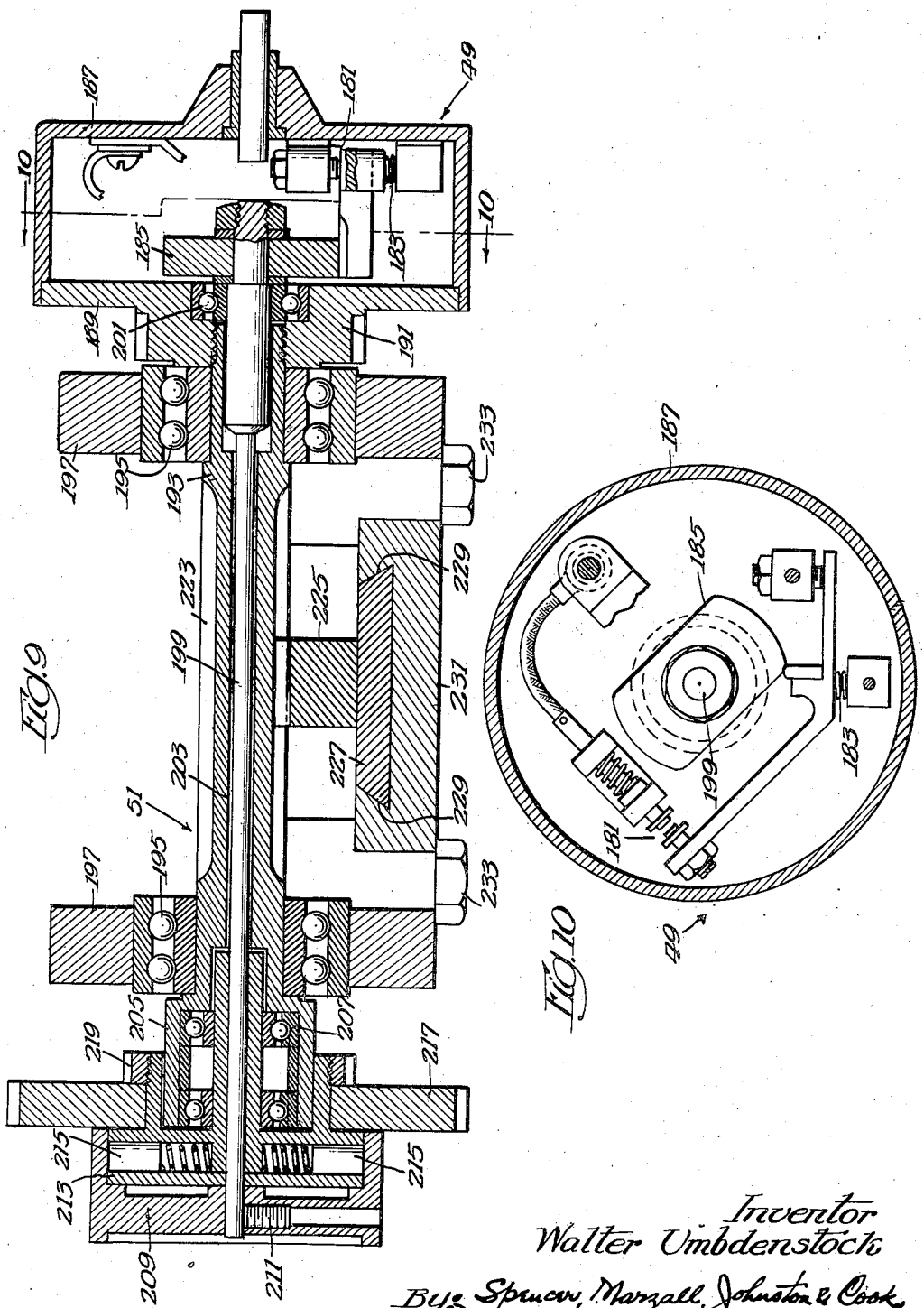
Inventor
Walter Umbdenstock
By Spencer, Marzall, Johnston & Cook
Attys Patented Nov. 2, 1948

2,452,703

UNITED STATES PATENT OFFICE 2,452,703

DRILL GRINDING MACHINE

Walter Umbdenstock, Chicago, Ill., assignor to Lion Manufacturing Corporation, Chicago, Ill., a corporation of Illinois Application December 18, 1944, Serial No. 568,608

17 Claims. (Cl. 51—94)

The present invention relates in general to grinding machines and has more particular reference to machines for grinding drills.

An important object of the invention is to provide a grinding machine particularly adapted for grinding helical lands, as at the cutting edge of a drill.

Another important object is to provide a grinding machine adapted for grinding stepped drills.

A further object is to provide a grinding machine having coordinated means for feeding a work piece toward a grinding wheel in rhythmic fashion whereby to form a land in the work piece as along the cutting edge of a drill; a further object being to coordinate the rhythmic movement of the work piece with its longitudinal movement with respect to the grinding member in order to form the cut land to a desired helical shape.

Another object is to provide a work holding chuck for rotating a work piece with respect to a grinding element or wheel and having means for reciprocating the work piece in an axial direction and also in a direction laterally of the work piece whereby to present the same to a grinding member in rhythmic reciprocation in a plurality of directions to allow for the grinding of helical lands and shoulders in the work piece; a further object being to provide correlated means for controlling the axial and lateral reciprocating movement in timed relation the one with respect to the other, and with respect to the rotary movement of the work piece.

Another object is to provide suitable means for reciprocating the work piece in timed relation with its rotation and to utilize a spring actuated rotary cam to that end.

Another object is to provide suitable means for moving the work piece rhythmically in timed relation with its rotation and to utilize magnetic means to that end, the magnetic means being energized under the control of timer mechanism driven in timed relation with the work piece to reciprocate the same.

Another important object is to provide suitable timer mechanism for controlling the reciprocation of the work piece in timed relation with its rotation.

These and numerous other important objects, advantages and inherent functions of the invention will become apparent as the invention is more fully understood from the following description, which, taken in conjunction with the accompanying drawings, discloses a preferred embodiment of the invention.

Referring to the drawings:

Fig. 1 is a top plan view of a grinding machine embodying the present invention;

Fig. 2 is a front view of the machine shown in Fig. 1;

Fig. 3 is an end view of the machine shown in Figs. 1 and 2;

Figs. 4 and 5 are sectional views, respectively, taken substantially along the lines 4—4 and 5—5 in Figs. 1 and 2;

Fig. 6 is a back view of the structure shown in Fig. 5;

Fig. 7 is a sectional view taken substantially along the line 7—7 in Fig. 1;

Fig. 8 is a sectional view taken substantially along the line 8—8 in Fig. 7;

Fig. 9 is a sectional view taken substantially along the line 9—9 in Fig. 2; and Fig. 10 is a sectional view taken substantially along the line 10—10 in Fig. 9.

To illustrate the invention the drawings show a drill grinding machine particularly adapted for grinding helical lands as along the leading or cutting edge of drills and adapted also for the forming of stepped drills, that is to say, drills having cuttings tips of relatively small diameter and cutting bodies of larger diameter adjacent and behind the tip, and having cutting shoulders extending between the tip and the body. It should be understood, of course, that a stepped drill may have one or more shoulders and two or more drilling portions of unlike diameter.

As shown in the drawings, the grinding machine affords means for presenting a work piece 11, comprising a drill, in position to be ground by a grinding element comprising a grinding wheel 13.

The work piece as shown more particularly in Figs. 7 and 8 may comprise a cylindrical stem having two or more helical grooves 15 cut in the end of the stem, leaving helical flutes 17 between the grooves 15.

By projecting and retracting the work piece laterally toward and away from the grinding wheel, during each rotation, and by properly timing the movement so that grinding engagement of the work piece and grinding wheel may take place just after the leading edge of a flute, during rotation of the work piece, has cleared the grinding wheel, the material at the surface of the flute may be ground away as shown at 19, leaving a land 21 at said leading edge of the flute. Of course, the grinding machine will be arranged to project and retract the work piece as many times during one revolution of the work piece as there are flutes on the drill, the piece being projected in proper timed relationship to allow for the formation of the lands, and being retracted during the period when a groove 15 is facing the grinding wheel.

The projection and retraction of the work piece in forming the lands 21 by undercutting the flute surfaces from the trailing edges of the lands to the trailing edges of the flutes, may also be controlled so as to increase the depth of the undercutting 19 toward the trailing edges of the flutes. The ground away, or undercut portions 19 may thus uniformly and progressively increase in depth from the lands 21 toward the trailing edges of the flutes 17.

In the fabrication of a stepped drill, that is to say, a drill having a tip of relatively small diameter and a body of larger cutting diameter adjacent the tip, there will be a shoulder 23 in each of flutes 17 joining the flute portions forming the drill body, with the flute portions of lesser diameter forming the drill tip. By reciprocating the work piece axially during the grinding operation, the surfaces of these shoulders may be given a helical screw configuration in order that the leading edge 25 of these shoulders may form a cutting edge. The shoulder forming surfaces 23 also may be joined to the flute surfaces of the drill tip by means of a rounded fillet to thereby strengthen the tip portion and avoid the formation of burrs in holes drilled by the finished drill, at the step therein. To this end, the work piece may be reciprocated axially, in timed relationship with its rotation, to retract the work piece to a maximum extent during the period when a groove 15 is opposite the grinding wheel. The work piece may be progressively projected toward the grinding wheel while a flute 17 is turning against the wheel so that the shoulder may be cut in the flute and inclined in the drill so that its trailing edge 27 is offset behind its leading edge in a direction away from the cutting end or tip of the drill.

Furthermore, by correlating the lateral with the axial movement of the work piece in timed relationship the one with respect to the other, the shoulder 23 may be given a twisted configuration in which the outer portions 29 of the shoulder are offset with respect to the inner portions 31 in a direction away from the tip of the drill, and said outer portions 29 may be offset with respect to the inner portions 31 to a greater degree adjacent the trailing edge 27 than in the shoulder portions adjacent the leading edge 25.

In order to provide for drill grinding in the manner described, the grinding machine of the present invention comprises a suitable base 33 forming a mounting for the grinding wheel 13 and a sliding frame 35, which is movable on the frame 33 toward and away from the grinding wheel 13 in response to manual operation of a hand wheel 37. The sliding frame or carriage 35 supports a chuck 39 having facilities for supporting the work piece 11 in position for grinding against the wheel 13. The carriage 35 also supports a drive motor 41 and gear train 43, through which the motor is connected to rotate the chuck 39 and the work piece 11, so that the same may be presented to the grinding wheel and rotated during the grinding operation.

The chuck is provided with means including a cam 45 for reciprocating the same and the work piece in a direction axially thereof, and means including an armature 115 and an electro-magnet 47 is also provided for moving the chuck and work piece laterally toward and away from the grinding wheel while the work piece is being rotated in grinding position. As shown, the reciprocating means 45 comprises a cam, while the means 47 embodies a magnet energized under the control of a timer mechanism 49, which is driven from the motor 41 and hence functions in timed relationship with the turning movement of the work piece. The grinding machine includes facilities for rotatably adjusting the cam 45 as well as the timing mechanism 49 so that the axial and lateral movement of the work piece may take place as a timed function of the rotation of the work piece, that is to say, by adjusting the cam, the projection and retraction of the work piece in an axial direction may be timed to take place at definite predetermined intervals during each revolution of the work piece. Likewise, the timing mechanism 49 may be adjusted to cause lateral projection and retraction of the work piece toward and away from the grinding wheel at desired intervals during its rotation. The timing mechanism further includes facilities, indicated generally at 51, automatically causing the advancement or retardation of the timer as the carriage 35 is moved on the main frame to carry the work piece across the grinding wheel. This causes the work piece, as it is moved axially, to project toward and to retract from the grinding wheel at the proper instant so that the lands 21 may be cut helically along the edges of the helical flutes 17.

The support frame or base

The base 33 on which the grinding machine is mounted preferably comprises an elongated bed plate 53, having depending lateral walls 55, and supported on suitable legs 57. Bed plate 53, in its upper surface, is formed with grooves 59 and 61 for receiving corresponding ribs 63 and 65 formed on the under surface of the carriage 35. The carriage 35 comprises a plate-like block adapted to support the chuck 39, the motor 41, the transmission 43, and the timer 49. The carriage 35 at its underside carries a longitudinally extending rack 67, which extends downwardly of the carriage in a slot 69 formed in the bed plate 53. The rack 67 is drivingly connected with a gear 71 carried on a shaft 73, the opposite ends of which are supported in bearings 75 formed on and extending inwardly of the lateral walls 55 of the base. An end of the shaft 73 extends outwardly of the wall 55 at the front of the base and carries a hand wheel 37 thereon so that by turning the hand wheel the carriage 35 may be moved in either direction along the top of the bed plate, through the action of the gear 71 and the rack 67.

The grinder head

The grinding wheel 13 is supported in a head 77, which provides bearings 79 for a shaft 81 on which the wheel is mounted. The head 77 provides support for a motor 83, which is connected to drive the shaft 81 as by means of suitable pulleys drivingly connected by a belt 85. The bearings 79 are secured together in a bracket 79ª rotatably mounted in the head 77 and secured in adjusted position by the bolts 78 passing through the arcuate slots 78ª (see Fig. 2). The head also is supported in a carriage movable transversely of the frame under the control of a suitable hand wheel carried on a shaft extending through and supported by the walls 55.

The work head

The chuck 39 is carried on a work head 87 comprising a block 89 formed with a cylindrical opening 91 in which the chuck extends. The block is formed with a base plate 93 and is suitably supported upon spaced pedestals 95, which in turn are mounted on the carriage 36, suitable bearings 97 being provided for supporting the plate 93 on the pedestals 95 for rocking movement about an axis parallel to the axis of the chuck.

The base plate 93 has an extension 99 projecting on one side of the work head in position to overlie a stop screw 101 threaded in a mounting 103 on the carriage 35 and thus adapted to form an adjustable stop for limiting the rocking movement of the head in one direction about the axis of the bearings 97. The block 89 is provided with a flange 105 extending therefrom on the side of the bearings 97 opposite from the extension 99 in position to overlie adjustable stop means for limiting the rocking movement of the head in the opposite direction about the axis of the bearings 97, said stop means comprising a pedestal 107 on the carriage 35 and a bolt 109 adjustably threaded in the pedestal in position to extend beneath the flange 105. A pair of springs 111 is provided in position, between the carriage 35 and the flange 105, to normally urge the head on the pivots 97 in a direction to engage the extension 99 with the stop 101, the head being movable about the pivots 97, in the opposite direction against the influence of the springs 111, through an angular distance limited by the engagement of the flange 105 with the stop 109. Spring tension may be adjusted by means of the adjustable screws 113 mounted in the flange 105 and forming mountings for the ends of the springs.

In order to move the head against the influence of the springs 111, the carriage 35 supports the electromagnet 47 in position beneath the flange 105 to cooperate with an armature piece 115 on the flange so that whenever the magnet is electrically energized, the head will be rocked from the position illustrated more particularly in Fig. 5, to a position in which the flange 105 engages the stop 109.

The chuck 39 comprises a stem 117 having an axial cavity 119 at one end in which is received a split friction clutch element 121. This clutch element is adapted to receive the work piece 11 and to frictionally grip and secure the same to the stem 117. The clutch element 121 is held against rotation with respect to the stem 117 by means of a key 123, in the stem 117, and forms a splined connection with the clutch element. The clutch element is held in the cavity 119 by a gland 125 threaded upon the end of the stem 117 having the cavity 119, said end projecting outwardly of the block 89. By tightening the gland 125 upon the threaded end of the stem the clutch element 121 is forced axially into the cavity 119 and is caused to bindingly grip a work piece therein by the interaction of cam surface 127 in the cavity 119 at the end of the stem 117 and on the outer surface of the split clutch element. The stem 117 is supported in suitable bearings 129 located in the head at the opposite ends of the channel 91. The projecting socketed end of the stem 117 is provided with an outstanding flange 131 forming a support for a thrust bearing 133 carried in and supported on one side by a mounting 135. The other side of the thrust bearing 133 engages a spring 137 mounted in the end of the head so that the chuck 39 is normally urged by the spring 137 in a direction to project the chuck and work piece axially of the head. Movement of the chuck under the influence of the spring, however, is limited by the engagement of a flange 139 formed on the stem 117 in position to engage the end of the block 89 remote from the spring 137. The flange 139 forms a raceway for roller bearing means 141 forming a thrust bearing for the stem 117. Outwardly of the bearing 141 the stem carries a collar 143 having a head forming the cam 45, said cam being formed in the surface of the head which faces the end of the block 89.

The block 89 at its end adjacent the cam 45 carries a mounting for a cam following roller 145 carried in a manually operable bell crank for advancing and retracting the cam following roller with respect to the cam 45. When the roller is retracted from the cam, the same is inactive and the stem 117 may rotate in the block 89 on the bearing 141 under the influence of the spring 137. When, however, the cam follower 145 is projected, the cam will be active and rotation of the stem will impart longitudinal movement in accordance with the shape of the cam. The cam is formed with projections 147 at spaced intervals so that the stem 117 will be drawn or retracted axially whenever a projection encounters the cam following roller 145. Where the work piece 11 is formed with two drill grooves 15, the cam 45 may be provided with a pair of diametrically opposite projections 147 at an angular position with respect to the stem so that the stem may be retracted during the intervals when the grinding wheel is opposite the grooves 15 in order that the drill may be formed with the inclined shoulder 31 heretofore described. Since the shoulder 31 is formed at a particular zone in the drill, it is not necessary to provide for the automatic adjustment of the cam 45 angularly with respect to the stem. However, means is provided for adjusting the cam 45 angularly in order to locate the projections at a required position to adjust the mechanism to a particular work piece in the chuck. This is accomplished by fastening the collar 143 on the stem 117 by means of one or more set screws 149, adjustment being facilitated by a hand knob 151 screwed on the projecting end of the stem 117 adjacent to the collar 143.

The stem 117 also is formed with a slot or cavity 153 in position within the block 89 to receive a locking stud 155 carried on a stem which is axially movable in a bushing 157 mounted on the block 89. The locking stud is yieldingly urged, as by means of a spring 159, in a direction to normally engage the stud 115 in the cavity 153 to thereby hold the stem 117 against rotation to facilitate in setting up the equipment for grinding a work piece. The stud 155, however, may be retracted against the influence of the spring by means of a handle 161 on the stem and latched in retracted position by means of a latching stud 163.

The collar 143 carries an annular gear 165 fixed thereon, said gear being in position to drivingly engage a pinion 167 forming a part of the transmission 43 through which the motor 41 is drivingly connected to turn the chuck 39.

The transmission 43 comprises a drive shaft 169 carrying the pinion 167 and a gear 171 which is drivingly connected in turn with a gear 173 on the shaft of the motor 41.

The shaft 169 is journaled in suitable bearings 175 and 177 on the carriage 35, and the motor 41 may be supported on a bracket 179 which is also mounted on the carriage 35.

The timer mechanism

In order to advance and retract the work piece laterally toward and away from the grinding wheel 13 whereby to cut the lands 21 in the work piece, means is provided for energizing the magnet 47 so as to rock the work head in a direction on its pivots 97 to engage the work piece with the grinding wheel at the instant when the land portion of the work piece has cleared the grinding wheel during the rotation of the said piece. As the work piece is advanced axially with respect to the grinding wheel by the manipulation of the hand wheel 37, it will be seen that the actuation of the magnet will have to be advanced or retarded, as the case may be, so that the lands 21 may be cut in conformity with the helical configuration grooves 15 in the work piece. To this end actuation of the magnet is controlled by the timer mechanism 49 which comprises a switch 181 electrically connected in the energizing circuit of the magnet 47. The switch 181 is normally closed as by means of a spring 183 but may be opened against the influence of the spring by the operation of a switch opening cam 185. This cam is driven in timed relation with the rotation of the work piece 11 so as to energize the magnet during the periods required for cutting the lands 21. The cam also may be adapted to actuate the switch one or more times for each rotation of the cam depending upon the ratio of the gear trains driving the cam and the work piece. If the cam and work piece be driven at the same speed, the cam will be designed to actuate the switch as many times during each rotation of the cam as there are grooves 15 in the work piece. If there be two grooves 15 in the work piece and the cam 185 be driven at two times the speed of the work piece, then the cam will necessarily be designed to actuate the switch once during each rotation of the cam.

As shown more particularly in Fig. 10, the cam 185 is adapted to open the switch 183 two times during each rotation of the cam which is to say that, in the embodiment illustrated wherein the work piece 11 contains two grooves 15, the cam 185 and work piece 11 are driven at the same speed of rotation.

The switch 181 is supported in a preferably shell-like casing comprising a cup-like cover 187 mounted at its edges upon a supporting disc 189 having a central hub 191 formed with a central opening and threaded upon a shaft 193. The shaft 193 is rotatably supported in bearings 195 which in turn are mounted in pedestals 197 supported on the carriage 35.

The cam 185 is fastened upon an end of a cam driving stem 199 extending within the cover 187 in position to actuate the switch. The stem 199 is journaled in a bearing 201 mounted in the hub 191, and extends thence through an axial bore 203 in the shaft 193, the stem 199 projecting at the end of the shaft 193 remote from the timer housing. Said remote end of the shaft 193 is formed with an enlargement 205 containing bearings 207 supporting the projecting end of the stem 199, said projecting end carrying a head 209 forming a hand knob secured to the stem, as by means of one or more set screws 211, and enclosing a friction clutch 213 comprising a member provided with spring pressed pressure elements 215 frictionally connecting the clutch member 213 with the head 209 and hence with the stem 199. Inwardly of the head 209, the clutch member 213 is provided with a sleeve extension with a center recess constructed loosely to embrace the enlarged portion 205 of shaft 193 and such sleeve portion has a driving gear 217 secured thereto as by means of a fastening nut 219 threadedly engaging said sleeve portion. This gear 217 is drivingly connected with the drive shaft 169 by gears 221 including a driving gear on the drive shaft 169 whereby the stem 199 is driven by the motor 41 and hence in timed relationship with the work piece 11. The purpose of the clutch means 213 is to allow for changing the angularity of the switch actuating cam 185 with respect to the drive means in order to adjust the timer quickly and easily.

In order to automatically adjust the timer in accordance with the longitudinal position of the carriage 35 with respect to the grinding wheel, the shaft 193 on which the switch carrying members 187 and 189 are secured is provided with external flutes 223 forming gear teeth extending longitudinally of the shaft. These teeth drivingly engage with corresponding teeth on a rack member 225 on a slide 227 movable in guideways 229 formed in a plate 231 extending at the side of the carriage 35 and secured thereto as by means of the bolts 233. The lower ends of the plate 231 and the slide 227 extend adjacent the wall 55 at the front of the base 33 and said wall has mounted on it a plate member 235 formed with an edge providing a cam surface 237. The plate 235 is pivotally mounted on a stud 239 mounted in the wall 55 and said plate may be provided with an extending arm 241 forming a convenient handle for tilting the plate member 235 on its pivot pin 239 whereby the cam surface 237 may be arranged at any desired angularity on the frame. The plate 235 also may be provided with an arcuate slot 243 through which a locking stud 245 may extend for threaded engagement in a socket formed in the wall 55. By tightening the anchoring stud 245, the plate 235 may be secured in adjusted position. The slide 227 near its lower end carries a wheel or roller 247 in position to ride upon the cam surface 237. The weight of the rack and slide normally urges the same in a direction to maintain the roller 247 in engagement with the cam surface 237 thereby determining the angular position of the shaft 193. As the carriage 35 is moved in one direction or the other to move the work piece with respect to the grinding wheel, the plate 231 and the roller 247 will move with the carriage along the cam 237 and the shaft 193 consequently will be turned by the weight of the slide 227 and the driving connection between the rack 225 and the gear teeth 223 on the shaft. The amount of turning of the shaft 193 per unit of carriage movement is, of course, determined by the slope of the cam surface 237. When said surface is parallel with respect to the carriage guideways 59 and 61, the shaft 193 will not turn. As the inclination of the surface 237 with respect to the carriage guideway means is increased, the angular movement of the shaft 193 in response to carriage movement will increase. By properly adjusting the angularity of the plate 235, the movement of the shaft 193 can be made to correspond exactly with the helical configuration of the work piece grooves 15. Since the switch 181 is carried by the shaft 193, movement of the shaft in the manner described under the control of the cam 237 will automatically advance or retard the operation of the switch as a proportional function of carriage movement. Consequently, by adjusting the cam 237, the actuation of the switch 181 may be regulated to cause the magnet to operate at progressively changing angular intervals during the rotation of the work piece whereby the same may be presented to the grinding wheel in a manner allowing for the grinding thereon of the helical lands 21.

The control of the timer accomplished by inclining the cam surface 237 in the direction shown in Fig. 2 of the drawings may be reversed merely by adjusting the surface 237 to an opposite inclination by pushing the handle 241 downwardly. By so doing, the automatic adjustment of the timing mechanism will take place in reverse thereby enabling the machine to be used with equal facility upon right and left hand twisted drills.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A grinding machine comprising means for supporting and rotating a work piece in grinding position with respect to a grinding member, including a chuck head, a carriage for said head, said carriage being movable to traverse the work piece in front of the grinding member, means to reciprocate said carriage, said head being movable on the carriage in a direction transversely of the direction of movement of the carriage whereby to project the work piece grindingly against said member, spring means normally holding the head in retracted position, a magnet operable to move the head against the resistance of the spring means, adjustable means for limiting the movement of said head, and timer means for actuating the magnet in timed relation with respect to the rotation of said work piece whereby said head and work piece will be moved toward and from said grinding member at timed intervals during the rotation of said work piece.

2. A grinding machine as set forth in claim 1 wherein said timer is adjustable, means actuated by said carriage during movement thereof to adjust said timer to advance or retard the actuation of the magnet in response to traversing movement of said carriage.

3. A grinding machine as set forth in claim 1 wherein said timer is adjustable, means actuated by said carriage during movement thereof to adjust said timer to advance or retard the actuation of the magnet in response to traversing movement of said carriage and means adjustable to determine the rate of advancement and retardation.

4. The mechanism of the class described, the combination of a supporting base, a grinding member carried thereby, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck and means to actuate said timer to close the circuit of said magnet in synchronism with the rotation of said chuck.

5. The mechanism of the class described, the combination of a supporting base, a grinding member carried thereby, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck, means to actuate said timer to close the circuit of said magnet in synchronism with the rotation of said chuck, and means to advance or retard the actuation of said timer.

6. The mechanism of the class described, the combination of a supporting base, a grinding member carried thereby, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck, and means to actuate said timer to close the circuit of said magnet in synchronism with the rotation of said chuck, said timer including a circuit breaking member, a rotatable shaft carrying said last named member, manual adjusting means operatively associated with said shaft for manual advance or retardation of said circuit breaking member.

7. The mechanism of the class described, the combination of a supporting base, a grinding member carried thereby, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck, and means to actuate said timer to close the circuit of said magnet in synchronism with the rotation of said chuck, said timer including a circuit breaking member, a rotatable shaft carrying said last named member, manual adjusting means operatively associated with said shaft for manual advance or retardation of said circuit breaking member, means to rotate said shaft, said adjusting means being yieldingly connected to said shaft rotating means.

8. The mechanism of the class described, the combination of a supporting base, a grinding member carried thereby, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck and means to actuate said timer to close the circuit of said magnet in synchronism with the rotation of said chuck, said timing means comprising normally closed contacts in the magnet circuit, a carrying member for said contacts, a rotatable circuit breaker operable intermittently to separate said contacts and open said circuit, a rotatable shaft carrying said circuit breaker, means to rotate the same in synchronism with said chuck rotating means, a shaft connected to said contact carrying member and means adjustably to rotate said last named shaft to advance or retard the circuit breaking action of said circuit breaker.

9. The mechanism of the class described, the combination of a supporting base, a grinding member carried thereby, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck, and means to actuate said timer to close the circuit of said magnet in synchronism with the rotation of said chuck, said timing means comprising normally closed contacts in the magnet circuit, a carrying member for said contacts, a rotatable circuit breaker operable intermittently to separate said contacts and open said circuit, a rotatable shaft carrying said circuit breaker, means to rotate the same in synchronism with said chuck rotating means, a shaft connected to said contact carrying member and means adjustably to rotate said last named shaft to advance or retard the circuit breaking action of said circuit breaker, said last named means comprising teeth upon said second named shaft and a slidable rack having teeth latching therewith whereby movement of said rack will angularly move said second named shaft and contact carrying member.

10. The mechanism of the class described, the combination of a supporting base, a grinding member carried thereby, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck and means to actuate said timer to close the circuit of said magnet in synchronism with the rotation of said chuck, said timing means comprising normally closed contacts in the magnet circuit, a carrying member for said contacts, a rotatable circuit breaker operable intermittently to separate said contacts and open said circuit, a rotatable shaft carrying said circuit breaker, means to rotate the same in synchronism with said chuck rotating means, a shaft connected to said contact carrying member and means adjustably to rotate said last named shaft to advance or retard the circuit breaking action of said circuit breaker, said last named means comprising teeth upon said second named shaft and a slidable rack having teeth latching therewith whereby movement of said rack will angularly move said second named shaft and contact carrying member, a carriage, said carriage being slidably mounted on said base and carrying said work head and timing means, means to move said carriage upon said base, rack operating means operable to move said rack upon movement of said carriage upon its supporting means and thereby said contact carrying member.

11. The mechanism of the class described, the combination of a supporting base, a grinding member carried thereby, a carriage slidably mounted on said base, a rockable work head carried thereby, a chuck carried by said head, a spring member co-acting with said head yieldingly to retain the same in rest position, a magnet operable upon excitation to rock said head from rest position against the resistance of said spring, timing means in circuit with the said magnet, means to rotate said chuck and means to actuate said timer to close the circuit of said magnet in synchronism with the rotation of said chuck, said timing means comprising normally closed contacts in the magnet circuit, a carrying member for said contacts, a rotatable circuit breaker operable intermittently to separate said contacts and open said circuit, a rotatable shaft carrying said circuit breaker, means to rotate the same in synchronism with said chuck rotating means, a shaft connected to said contact carrying member and means adjustably to rotate said last named shaft to advance or retard the circuit breaking action of said circuit breaker, said last named means comprising teeth upon said second named shaft and a slidable rack having teeth latching therewith whereby movement of said rack will angularly move said second named shaft and contact carrying member, carriage supporting means, said carriage being slidably mounted thereon, means to move said carriage upon its supporting means, rack operating means operable upon sliding movement of said carriage to move said rack upon its supporting means and thereby said contact carrying member, said last named means being adjustable to vary the rate of such movement.

12. The mechanism of the class described, a base member, a grinding member carried thereby, a carriage slidably mounted on said base member, a work head rockably mounted upon said carriage, a work carrying chuck rotatably mounted in said head, means to rock said head to and from its rest position during rotation of said chuck and in synchronism therewith, said last named means including an electro-magnet intermittently excited, timing means including contacts in circuit with said magnet and a circuit breaker operable intermittently to separate said contacts, a contact carrying member, a shaft secured to said circuit breaker, means to rotate said shaft in synchronism with said chuck rotating means to make and break the circuit including said contacts and magnet, one of the elements of said circuit breaker being manually adjustable to advance or retard the action of said circuit breaker, and means actuatable by said carriage upon movement thereof automatically to advance or retard the action of said circuit breaker.

13. The mechanism of the class described, a base member, a grinding member carried thereby, a carriage slidably mounted on said base member, a work head rockably mounted upon said carriage, a work carrying chuck rotatably mounted in said head, means to rock said head to and from its rest position during rotation of said chuck and in synchronism therewith, said last named means including an electro-magnet intermittently excited, timing means including contacts in circuit with said magnet and a circuit breaker operable intermittently to separate said contacts, a contact carrying member, a shaft secured to said circuit breaker, means to rotate said shaft in synchronism with said chuck rotating means to make and break the circuit including said contacts and magnet, one of the elements of said circuit breaker being manually adjustable to advance or retard the action of said circuit breaker, and means actuatable by said carriage upon movement thereof automatically to advance or retard the action of said circuit breaker, said last named means comprising a cam surfaced member carried by said base and a rack actuatable by the cam surface of said member.

14. The mechanism of the class described, a base member, a grinding member carried thereby, a carriage slidably mounted on said base member, a work head rockably mounted upon said carriage, a work carrying chuck rotatably mounted in said head, means to rock said head to and from its rest position during rotation of said chuck and in synchronism therewith, said last named means including an electromagnet intermittently excited, timing means including contacts in circuit with said magnet and a circuit breaker operable intermittently to separate said contacts, a contact carrying member, a shaft secured to said circuit breaker, means to rotate said shaft in synchronism with said chuck rotating means to make and break the circuit including said contacts and magnet, one of the elements of said circuit breaker being manually adjustable to advance or retard the action of said circuit breaker, and means actuatable by said carriage upon movement thereof automatically to advance or retard the action of said circuit breaker, said last named means comprising a cam surfaced member carried by said base and a rack actuatable by the cam surface of said member, said cam surface member being adjustably mounted to vary the movement of actuation of said rack member.

15. The mechanism of the class described, a base member, a grinding member carried thereby, a carriage slidably mounted on said base member, a work head rockably mounted upon said carriage, a work carrying chuck rotatably mounted in said head, means to rock said head to and from its rest position during rotation of said chuck and in synchronism therewith, said last named means including an electromagnet intermittently excited, timing means including contacts in circuit with said magnet and a circuit breaker operable intermittently to separate said contacts, a contact carrying member, a shaft secured to said circuit breaker, means to rotate said shaft in synchronism with said chuck rotating means to make and break the circuit including said contacts and magnet, one of the elements of said circuit breaker being manually adjustable to advance or retard the action of said circuit breaker, and means actuatable by said carriage upon movement thereof automatically to advance or retard the action of said circuit breaker, said last named means comprising a cam surfaced member carried by said base and a rack actuatable by the cam surface of said member, said cam surface member being adjustably mounted to vary the movement of actuation of said rack member, said rack member being carried by said carriage, 16. A grinding machine comprising a frame, a grinding wheel on said frame, a carriage movable on said frame transversely of said wheel, a work head, a chuck carried thereby for supporting a work piece in grinding position with respect to said wheel, means for rotating said chuck, said work head being tiltable on said carriage in a direction transversely of the carriage whereby to project the work piece carried by said chuck grindingly against the wheel, means including a magnet for so tilting the head, timing means on said carriage electrically connected with said magnet and driven in timed relation with the rotation of the chuck for actuating the magnet, and cam means on the frame and carriage operably connected with said timing means for regulating the same progressively in response to carriage movement on the frame.

17. A grinding machine comprising a frame, a grinding wheel on said frame, a carriage movable on said frame transversely of said wheel, a work head, a chuck carried thereby for supporting a work piece in grinding position with respect to said wheel, means for rotating said chuck, said work head being tiltable on said carriage in a direction transversely of the carriage whereby to project the work piece carried by said chuck grindingly against the wheel, means including a magnet for so tilting the head, timing means on said carriage electrically connected with said magnet and driven in timed relation with the rotation of the chuck for actuating the magnet, cam means on the frame and carriage operably connected with said timing means for regulating the same progressively in response to carriage movement on the frame, and means co-acting with said chuck to reciprocate the same during each rotation thereof.

WALTER UMBDENSTOCK.

REFERENCES CITED

The following references are of record in the file of this patent:

UNITED STATES PATENTS

| Number | Name | Date |
|---|---|---|
| 1,323,452 | Gogsdill | Dec. 2, 1919 |
| 1,640,994 | Hanson | Aug. 30, 1927 |
| 1,895,830 | Walker | Jan. 31, 1933 |
| 2,079,785 | Ackley | May 11, 1937 |
| 2,099,724 | Cogsdill | Nov. 23, 1937 |